UNITED STATES PATENT OFFICE.

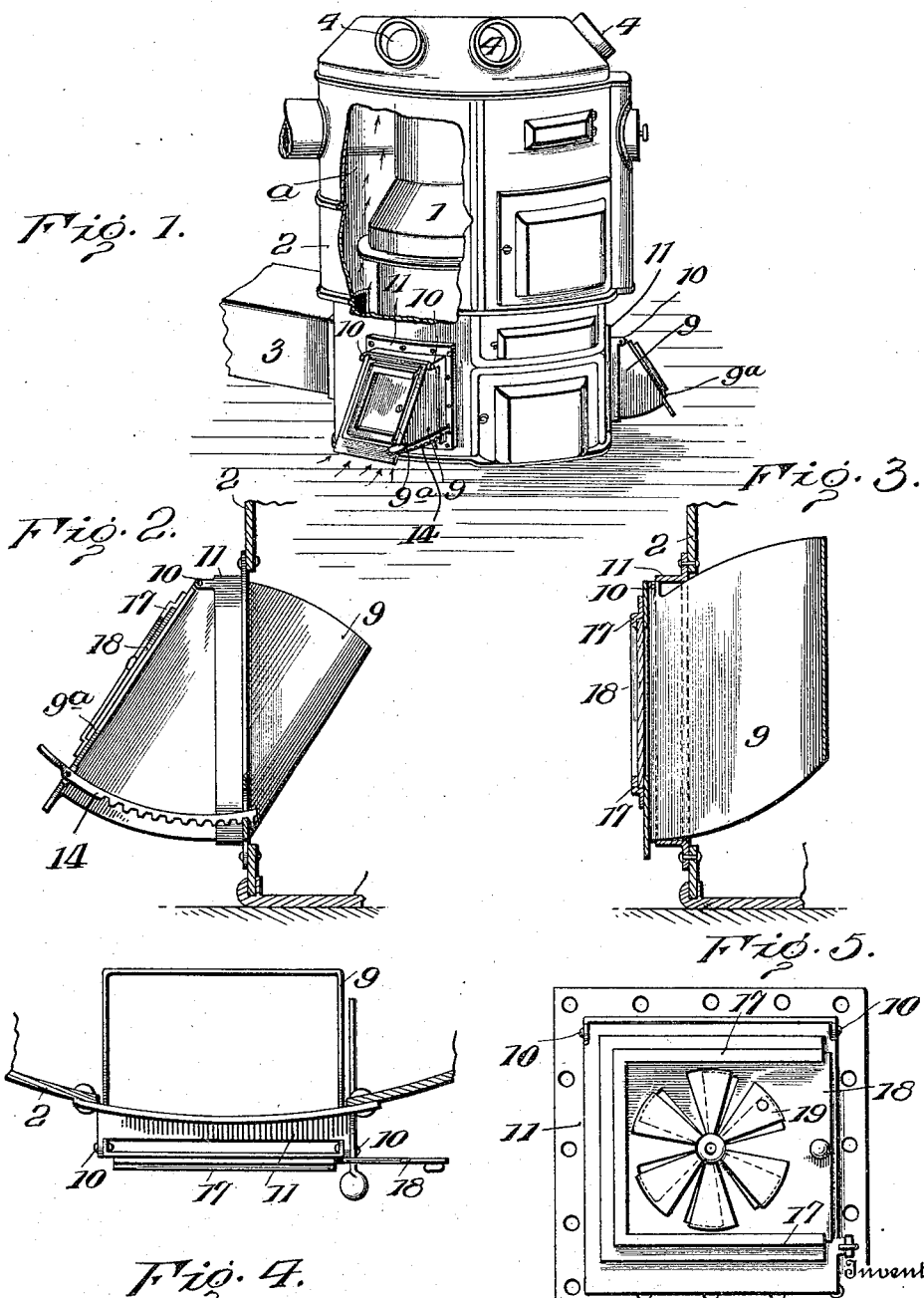

JOSEPH B. PENO, OF ROCHESTER, NEW YORK.

HOT-AIR FURNACE.

1,176,596.　　　　　Specification of Letters Patent.　　Patented Mar. 21, 1916.

Application filed November 30, 1914. Serial No. 874,696.

*To all whom it may concern:*

Be it known that I, JOSEPH B. PENO, a citizen of the United States, residing at Rochester, in the county of Monroe and State of New York, have invented certain new and useful Improvements in and Relating to Hot-Air Furnaces, of which the following is a specification.

This invention relates to certain improvements in and relating to hot air furnaces, casings, and the like; and the objects and nature of my invention will be readily understood by those skilled in the art in the light of the following explanation of the accompanying drawings illustrating what I now believe to be the preferred embodiment or mechanical expressions of my invention from among other forms, arrangements and constructions within the spirit and scope of the invention.

It is a general rule that hot air furnaces, particularly those wherein the cool air is delivered from a cool air box into the air space between the casing and the furnace body proper in which space the air is to be heated and from which it passes to the hot air pipes for delivery, show a marked loss in efficiency in the matter of volume of hot air actually delivered compared with the real capacity of the furnace for heating and delivering air. This loss in efficiency is due, generally, to improper or incomplete circulation of air through the hot air casing. There is usually not thorough uniform air circulation through all portions of the casing, and this lack of uniform thorough air circulation is manifested by the presence of over heated spots or portions of the casing. These spots can be readily located by placing the hand on various portions of the exterior of the casing. If there are approximately dead air spaces in the casing, if the air circulation is slow at any points or portions of the space within the casing, the part of the casing beside such portion will become unduly heated, and thus indicate loss of heat and incomplete air circulation. The furnace should heat and deliver its full capacity of air, if the air circulation is uniform and rapid throughout the entire furnace casing, and where the furnace is heating air and delivering the same, to its capacity, the exterior surface of the casing approximately throughout its area should be approximately cool to the touch.

I have discovered that the defective air circulation in such furnaces can be corrected by introducing cool or fresh air into the casing below said over heated portions of the casing and causing upward draft of such air to the approximately dead air spaces behind such over heated portions, and that when air is thus introduced at such points to start circulation, said furnaces will deliver greatly increased volumes of hot air, in fact will often delivery hot air to capacity even after such auxiliary supply of cool air has been shut off.

It is hence an object of my invention to provide means by which defective or incomplete air circulation in the casings or air passages of hot air furnaces can be cured or remedied.

It is a further object of the invention to provide improved means for application to hot air furnace casings, for the purpose of attaining approximately uniform or thorough air circulation in said casings with the end in view of increasing the volume of hot air delivered by such furnaces.

A further object of the invention is to provide certain improvements in arrangements, constructions or combinations, whereby an improved and highly efficient hot air furnace will be produced.

The invention consists in certain novel features and arrangements as more fully and particularly set forth hereinafter.

Referring to the accompanying drawings;—Figure 1, is a perspective view somewhat diagrammatically illustrating a hot air furnace having its casing embodying my invention. Figs. 2 and 3, are vertical sectional views through a portion of the furnace casing equipped with my invention, Fig. 2, showing the same open to admit cool air to the casing, and Fig. 3, showing the same closed and in position to promote air circulation within the casing. Fig. 4, is a horizontal section through a portion of the furnace casing taken in a horizontal plane just above the structure illustrated by Figs. 2 and 3. Fig. 5, is a detail front elevation.

In the drawings, I show a hot air furnace for heating a house or other building, and this furnace comprises the furnace proper 1, usually comprising a base or ash box, the fire pot and the heating drum. This furnace proper or heating element is inclosed by a suitable casing 2, to provide an air heating and circulating space $a$, around the furnace proper. The casing is provided with any suitable cold air box 3, through which cool air is supplied to space *a*. The air is heated in space *a*, and is delivered through suitable outlets 4, from the top or hood of the casing to pipes that carry the hot air to the rooms to be heated as will be readily understood by those skilled in the art.

For various reasons, the air delivered into the furnace casing from the cool air box, will generally follow the course of least resistance in rushing upwardly to the hot air outlets at the casing top, and will thereby leave dead or dormant spaces between the casing and furnace proper wherein the heat radiating from the furnace proper is not taken up and carried off by the air but is permitted to go to waste by heating the adjacent area of the casing and radiating therefrom into the cellar or basement where the heating plant is located, resulting in loss in efficiency by reason of the fact that this wasted heat should be absorbed by air flowing through the casing and conveyed thereby to the rooms to be heated. In other words, air should flow through all portions of the casing in sufficient volume, to absorb and carry off approximately all the heat radiating from the furnace proper and thereby approximately thoroughly insulate the casing.

Where a hot air furnace is not delivering the volume of hot air that it should and one or more spots or areas of the casing thereof consequently become unduly overheated during the operation of the furnace, it is within my invention to make any suitable or desirable provision to direct an independent supply of air through the lower part or base of the casing immediately below said dead or dormant portion of the air space within the casing, evidenced by said hot spot on the casing, to thereby supply an upward draft of air to said dormant space which will not only cause a flow of air from said space but will tend to draw air already in the casing upwardly through said space. My preferred construction, however, provides the casing at each auxiliary air inlet, with an air directing conduit, nozzle or chute 9, usually hinged at 10, to the frame 11, secured to the casing around said opening. This chute or nozzle consists of an oblong hollow box or metal conduit open at its upper and lower ends and throughout its length, with the outer vertical wall $9^a$, of the chute, forming the door or closure for the opening in frame 11, when the chute is swung to vertical position. The hinge pin or axis 10, on which the chute is swingable, is preferably arranged transversely of the chute and at the upper end of the front wall $9^a$, thereof so that when the chute is in vertical position said front wall will close the opening through the frame 11, and the chute will otherwise be located within the air space of the furnace casing with its ends open thereto and its upper end below the hot spot on the casing. Even when the chute is in this closed position, the heat radiated thereagainst from the furnace proper, will tend to create and maintain a constant up flow of air through the chute and thus tend to promote circulation. However, to thoroughly cure the dormant or dead space in the air space behind the hot spot on the casing, the chute is swung outwardly on its pivot or axis 10, to open or expose its lower end at the exterior of the casing. An inrush of cool air immediately passes upwardly through the chute into said dead space, and the upward rush of air into the space from the upper end of said chute, acts somewhat as an ejector in drawing air upwardly from lower portions of the air space and in most effectively promoting uniform circulation of air in the furnace casing and in preventing the dormant spaces mentioned.

Any suitable pivoted gravity latch such as 14, can be provided for holding the chute swung outwardly at the desired angle with its lower open end exposed the desired extent at the exterior of the casing. However, I do not wish to limit my invention concerning the chute, to mounting the same to swing on a horizontal axis or pivot.

If so desired, the front wall of the chute can be formed with an opening and adjacent slideways 17, to removably receive a suitable plate 18, for closing the opening. Said plate can be solid or imperforate so that air can be introduced through the chute only by swinging the same to expose its lower or inlet end at the exterior of the casing, or said plate can have one or more air inlet openings controlled by a register or damper 19, so that air can be introduced into the casing through the chute either by opening damper 19, while the chute is in vertical position within the casing, or by swinging the chute to expose its lower end as hereinbefore described. If so desired, several different kinds of removable plates 18, adapted to enter the slideways 17, of a chute, can be provided, so that one can be substituted for the other in a slideway to suit peculiar conditions that might arise or exist in the operation of any particular furnace.

While my invention primarily contemplates a method under which defective circulation in installed hot air furnaces having cold air supply boxes can be cured by the introduction of one or more independent or separate auxiliary supplies of air into the base of the casing at points opposite or remote from the cold air box, yet my invention can be applied to furnaces during the manufacture thereof or during the installation of the same.

It is evident that various changes, modifications and variations might be resorted to without departing from the spirit and scope of my invention, and hence I do not wish to limit myself to the exact disclosures hereof.

What I claim is;—

1. A hot air furnace casing having a side opening and a swingable air supply and circulating chute arranged in said opening and having an inlet opening at one end and an outlet opening at the other end, both of said openings being arranged within the casing to promote air circulation therein when said chute is in one position, and said inlet opening being exposed at the exterior of the casing and said outlet opening at the interior of the casing when said chute is in air supplying position.

2. Means for controlling a side air supply inlet for a hot air furnace casing and for promoting circulation within the casing comprising an open frame adapted to be inserted in an opening in the furnace casing, and an air inlet chute hinged to said frame to swing inwardly and outwardly thereof, said chute having open ends one of which forms the air inlet and the other the air outlet, the outer wall of said chute adapted to close said frame, and both open ends of the chute being arranged within the casing when the chute is swung inwardly to closed position.

3. Means for promoting upward circulation of air in a hot air furnace casing and for supplying cool air thereto, comprising a vertically disposed air circulating and supplying chute open at its upper and lower ends for the free upward passage of air through the chute from its lower end, said chute being swingable to expose its lower end at the exterior of the casing for the inlet of cool air, and to cut off its lower end from the exterior of the casing and to expose the same within the casing.

4. A hot air furnace comprising a furnace, a casing therefor providing an air heating space between the casing and furnace, said casing provided with a main cold air supply duct arranged to deliver outside cold air into the lower part of said space, and an auxiliary air inlet adapted to deliver air from the apartment wherein the furnace is located against the side of the furnace, whereby the air passing through the auxiliary inlet aids by an entraining action the flow of air delivered by the cold air supply, substantially as described.

5. A hot air furnace comprising a furnace, a casing therefor providing an air heating space between the casing and furnace, a main cold air supply duct opening into the lower part of said air heating space for supplying outside cold air for heating, and an auxiliary air inlet opening through said casing and arranged to deliver air from the exterior of the casing into said space and against the furnace and provided with a vertically-disposed air entraining chute arranged in said space, substantially as described.

6. A hot air furnace comprising a furnace, a casing therefor providing an air heating space around the furnace, a main cold air supply duct opening into the lower part of said space for discharging outside cold air thereinto for heating, said casing having a side-auxiliary air inlet opening through its base portion for delivering air into said space and against the furnace from the apartment containing the furnace, said inlet provided with a swingable air entraining chute open at both ends, substantially as and for the purposes described.

7. A hot air furnace comprising a furnace, a casing therefor providing an air heating space, around the furnace, and a main cold air supply duct opening into the lower part of said space for discharging outside cold air into said space for heating, the lower portion of said casing having an auxiliary air inlet at a point remote from said cold air supply, to discharge air into said space from the exterior of said casing, said auxiliary inlet provided with a vertically disposed air chute open at its upper and lower ends and having its upper air discharge end arranged within the casing, the outer wall of said chute forming a portion of the casing wall and provided with a damper controlled air inlet, substantially as and for the purposes described.

In testimony whereof I affix my signature in presence of two witnesses.

JOSEPH B. PENO.

Witnesses:
CARL R. SNIDER,
GEO. W. BURKS.

Copies of this patent may be obtained for five cents each, by addressing the "Commissioner of Patents, Washington, D. C."